United States Patent [19]

Fredriksson

[11] 4,301,589

[45] Nov. 24, 1981

[54] CHAIN SLING TOOL

[75] Inventor: Lars O. A. Fredriksson, Växjö, Sweden

[73] Assignee: K A Bergs Smide AB, Gemla, Sweden

[21] Appl. No.: 88,087

[22] Filed: Oct. 24, 1979

[30] Foreign Application Priority Data

Nov. 2, 1978 [DE] Fed. Rep. of Germany ....... 2847529

[51] Int. Cl.$^3$ .................................... B23Q 1/00

[52] U.S. Cl. .................................... 29/283; 145/46

[58] Field of Search .................... 29/283; 145/46; 206/347

[56] References Cited

U.S. PATENT DOCUMENTS

| | | | |
|---|---|---|---|
| 2,716,750 | 9/1955 | Biblis | 145/46 |
| 3,097,360 | 7/1963 | Carlson et al. | 206/347 |
| 3,211,284 | 10/1965 | Anstett | 206/347 |

FOREIGN PATENT DOCUMENTS 1670 of 1906 United Kingdom ................ 206/347

*Primary Examiner*—James L. Jones, Jr.
*Attorney, Agent, or Firm*—Fulwider, Patton, Rieber, Lee & Utecht

[57] ABSTRACT

A tool for facilitating the mounting of locking pins in hooks, shackles, eyes and other chain auxiliaries or the like comprises a holder for a supply of locking pins. These are releasably retained, e.g. by a friction grip, in at least one row of apertures in the holder, which suitably is of plastic. When mounting a locking pin by means of the tool the pin is placed with its lower end immediately above the aperture, in which the pin shall be located, and is driven in into the aperture by means of a hammer blow. The tool preferably also comprises a drift pin for driving locking pins out of the chain auxiliary or the like by means of hammer blows upon the draft pin.

8 Claims, 9 Drawing Figures

CHAIN SLING TOOL

BACKGROUND OF THE INVENTION

This invention relates to a tool for mounting and possibly also dismounting of locking pins and the like.

Locking pins are utilized e.g. in connection with chain accessories in the form of hooks, eyes, shackles or the like, which have a bifurcated end with two shanks, which are provided with coaxial, through bores in which a load-carrying bolt is inserted, which is secured or retained by means of the pins in question.

In the annexed drawings FIGS. 1–7 illustrate the state of art.

FIG. 1 illustrates a chain accessory in the form of a load hook 1 which has a bifurcated upper end with two shanks 2. The two shanks are provided with mutually coaxial bores 3, in which a load-carrying stud or bolt 4 is introduced which passes through a chain end link 5 which projects into the interspace between said shanks or lugs 2. In FIG. 2 a U-bolt or shackle 7 is substituted for the hook.

The locking or securing of the load-carrying bolt can be brought about in a plurality of different ways, as will become apparent from the following, and depends on the design of the bolt.

In FIG. 3 there is illustrated a bolt or stud 4 of the kind referred to in FIGS. 1 and 2. As is evident from FIG. 3 the stud 4 has two constrictions or annular grooves 8, and a locking pin 9 is in engagement with each of said grooves. The pin 9 is resilient in the radial direction and may be designed in the manner disclosed in FIG. 4. According to FIG. 4 the pin has the shape of a sleeve which is slotted along a generatrix. The pins 9 are driven in into apertures 10 which pass straight through the shanks 2. The annular grooves 8 or constrictions and the pins 9 cooperating therewith secure the stud 4 and prevent its displacement in the axial direction.

FIG. 5 illustrates another mode of locking. According to FIG. 5 the stud 4 is substantially shorter than the total width of the hook end or the shackle end, whose shanks 2 as before are penetrated by two apertures 10, which, however, in this case extend substantially diametrically instead of substantially tangentially with respect to the bore 3. The apertures 10 and the pins 9 are disposed externally of the ends of the stud 4 which is hereby fixed in axial direction.

FIG. 6 shows a further alternative embodiment of the stud 4 whose one end now has a head 12 and whose other end is provided with a through, diametrical aperture 10, into which a pin 9 is driven in which is considerably longer than the diameter of the bore 3. The head 12 and the pin 9 fix or secure the stud 4 in the axial direction.

As is apparent from the above one stud 4 and at least one securing or locking pin 9 are common to the embodiments according to FIGS. 1, 2, 5 and 6. The pins 9 are generally short and thin, usually having a diameter of about 3–5 mm and a length of 15–25 mm. They are therefore difficult to handle, particularly in cold weather and/or at work with working gloves. FIG. 7 illustrates how the pin 9 is conventionally held by the hand and is driven in into an aperture 10 by means of a hammer. Obviously there is a risk of getting oneself hit on ones fingers as well as difficulties with respect to the handling, which delays work and makes it more time consuming. In addition hereto a special drift pin, which, however, is not always at hand, is required for the dismounting.

SUMMARY OF THE INVENTION

With regard to the above circumstances the primary object of the invention is to provide a tool for the mounting, and preferably also the dismounting, of locking or fixing pins, which is easy to handle, even in cold weather and at work with gloves.

This object is attained thanks to the fact that the tool in accordance with the invention comprises a slatlike or platelike holder for a supply of locking pins, and at least one row of apertures in said holder for releasably retaining said pins in said holder. According to an advantageous further development of the tool, which preferably is made of plastic, the tool also has a drift pin for driving out locking pins which are driven in into a chain accessory or the like.

BRIEF DESCRIPTION OF THE DRAWINGS

Further features and advantages of the tool according to the invention will become apparent from the following detailed description and the annexed drawings, which diagrammatically and as non-limiting examples illustrate some embodiments of the invention.

FIG. 8 is a perspective side view illustrating the tool according to the invention and its utilization for driving in a pin into an aperture of a chain accessory or the like.

DESCRIPTION OF THE PREFERRED EMBODIMENT

Figure 1:
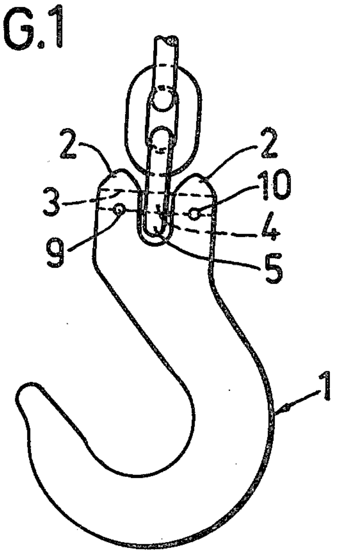
FIGS. 1–7 refer to the state of art, as has become apparent already from the above.
Figure 2:
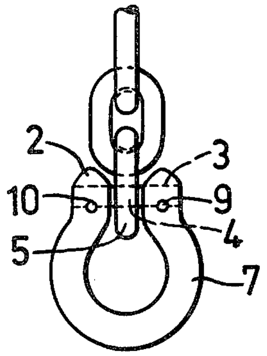
Figure 3:
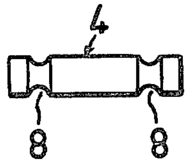
Figure 4:
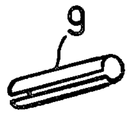
Figure 5:
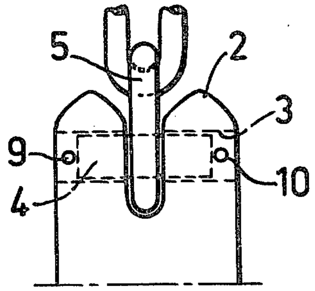
Figure 6:
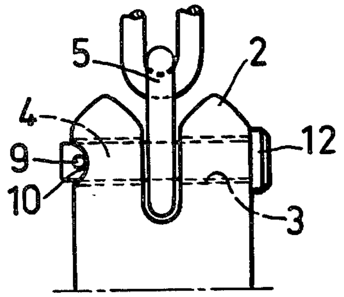
Figure 7:
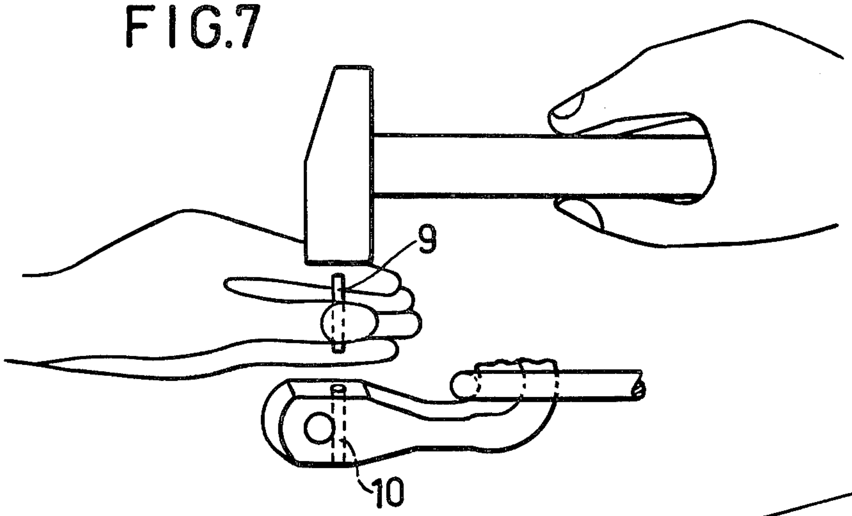
Figure 8:
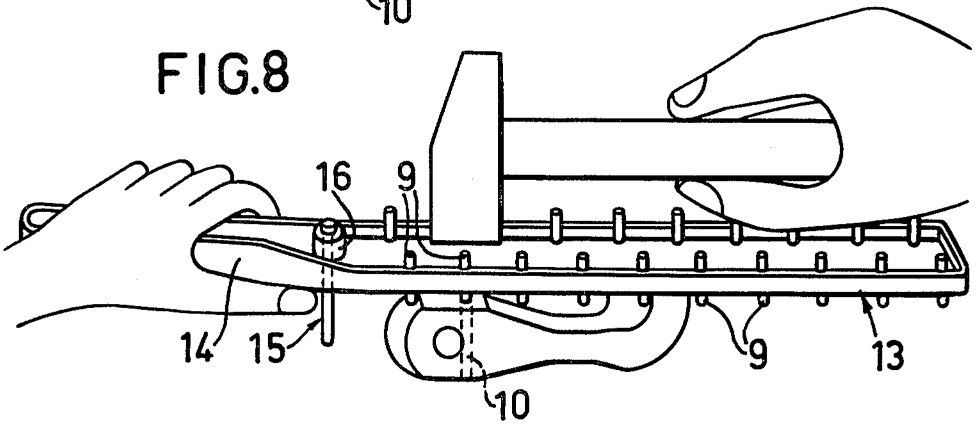

The tool according to the invention which is designed as a holder for a supply of locking pins is comprised of a slat-shaped plate 13 of plastic or a similar material, which is softer than the locking pins 9. The plate or slat 13 has a handle 14 and two rows of apertures in which locking pins 9 have been inserted in advance, e.g. manually, as is shown in FIG. 8. The locking pins are retained by friction and are not too firmly clamped. When the tool is used for the introduction of a locking pin 9 into an aperture 10, the lower end of the pin is placed immediately above the upper end of the aperture 10, after which the pin by means of a hammer blow is driven in partly into the aperture. After that the tool is raised and the pin 9 is driven in completely into the aperture 10 by means of another hammer blow.

Figure 9:
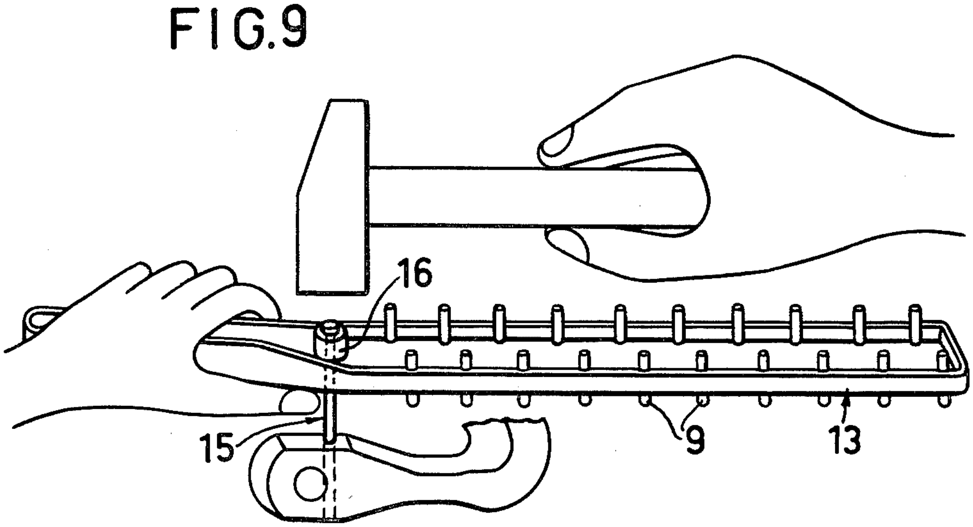
FIG. 9 is a perspective side view corresponding to FIG. 8 and illustrating the application of the tool when driving out a pin from an aperture.

In the preferred embodiment of the invention which is shown in FIGS. 8 and 9 the tool also comprises a drift pin 15 which preferably is located between the rows of apertures and the handle or shaft 14 and is intended for the dismounting of the chain accessory 1 or 7. In the disclosed embodiment the drift pin 15 has a circular cross section and is provided with a head 16. At the dismounting the lower end of the drift pin 15, which has a smaller diameter than the locking pin 9, is applied against the end of the pin 9 in the aperture 10, and subsequently the pin is driven out by means of the drift pin 15 through a hammer blow upon its head, as shown in FIG. 9

Considerable advantages are gained by the tool according to the invention. First, the mounting and dismounting of chain accessories is facilitated and accelerated. Secondly damages of hands are avoided. Thirdly one will get good order and a positive supply of locking pins 9 and a drift pin 15 always at hand. Loose pins and drift pins are thus obviated. Fourthly, it is possible to carry out mounting and dismounting even with working gloves on ones hands, even in cold weather, thanks to the tool according to the invention.

The embodiment described above and illustrated in the drawings is, of course, to be regarded merely as nonlimiting example and may as to its details be modified in several ways within the scope of the following claims. For instance, the tool may be shaped more like a plate than like a slat. Furthermore, the number of rows of apertures may be another than two, for example one, three or more. In addition hereto the handle of shaft may be located substantially centrally in respect of the rows of apertures and extend substantially perpendicularly to the longitudinal direction of the rows of apertures. Finally, the handle may be constituted of part of the pin retaining portion of the tool.

What I claim is:

1. A tool for manual mounting and dismounting of composite chain slings comprising a suspension member having a load carrying stud or bolt and at least one locking pin for retaining such stud or bolt in said suspension member, said tool comprising in combination a self-supporting slatlike or plate-like holder for supply of locking pins, at least one row of apertures in said holder for releasably retaining said pins in said holder, and a grip or handle, wherein said holder comprises a drift pin for driving out locking pins which have been driven into an aperture in said suspension member, said drift pin being permanently secured to said holder and at one of its ends being provided with an enlarged head for receiving hammer blows and for preventing the drift pin from becoming displaced with respect to the holder due to such hammer blows.

2. A tool according to claim 1, wherein said drift pin is located between said grip and said row of apertures.

3. A tool according to claim 1, wherein said drift pin is located adjacent to said row of apertures.

4. A tool according to claim 3, wherein said driftpin is located between said grip or handle and said row of apertures.

5. Tool according to claim 2, wherein said holder comprises two rows of apertures.

6. Tool according to claim 5, wherein said rows of apertures are straight and parallel.

7. Tool according to claim 4, wherein said grip or handle substantially registers with said row of apertures and pins.

8. Tool according to claim 2, wherein said holder is of plastic.

* * * * *